(12) United States Patent
Hakkarainen

(10) Patent No.: US 11,506,635 B2
(45) Date of Patent: Nov. 22, 2022

(54) ULTRASONIC QUALITY CONTROL USING FILTERED IMAGE DATA

(71) Applicant: WÄRTSILÄ FINLAND OY, Vaasa (FI)

(72) Inventor: Toni Hakkarainen, Vaasa (FI)

(73) Assignee: WÄRTSILÄ FINLAND OY, Vaasa (FI)

(*) Notice: Subject to any disclaimer, the term of this patent is extended or adjusted under 35 U.S.C. 154(b) by 863 days.

(21) Appl. No.: 16/410,075

(22) Filed: May 13, 2019

(65) Prior Publication Data

US 2019/0265198 A1    Aug. 29, 2019

Related U.S. Application Data

(63) Continuation of application No. PCT/FI2016/050838, filed on Nov. 29, 2016.

(51) Int. Cl.
*G01N 29/06* (2006.01)
*G01N 29/30* (2006.01)
(Continued)

(52) U.S. Cl.
CPC ....... *G01N 29/069* (2013.01); *G01N 29/0609* (2013.01); *G01N 29/0654* (2013.01);
(Continued)

(58) Field of Classification Search
CPC ............. G01N 29/069; G01N 29/0609; G01N 29/0654; G01N 29/30; G01N 29/4436;
(Continued)

(56) References Cited

U.S. PATENT DOCUMENTS

2017/0330314 A1* 11/2017 Stu .......................... G06T 5/50

FOREIGN PATENT DOCUMENTS

| JP | S61128162 A | 6/1986 |
| JP | H0580034 A | 3/1993 |

(Continued)

OTHER PUBLICATIONS

International Preliminary Report on Patentability (PCT/IPEA/409) dated Oct. 26, 2018, by the European Patent Office as the International Searching Authority for International Application No. PCT/FI2016/050838.

(Continued)

*Primary Examiner* — Xin Y Zhong
(74) *Attorney, Agent, or Firm* — Buchanan Ingersoll & Rooney PC

(57) ABSTRACT

An ultrasonic quality control as disclosed can inspect a quality of a piece and classify the piece automatically. The piece can be scanned, and an image formed from the scanning. A reference piece is also scanned, and a reference image is formed. A negative image of the reference image is formed, and an indication image is created by utilizing the image and the negative image. The indication image is filtered by utilizing several image filters, each image filter filtering all data of the indication image except an image filter specific indication level data. Further several indication levels data are provided from the image filter specific indication level data, and the piece can be classified utilizing the several indication levels data.

15 Claims, 5 Drawing Sheets

(51) Int. Cl.
  *G01N 29/44* (2006.01)
  *G06K 9/62* (2022.01)
  *G06T 7/00* (2017.01)
  *G01S 7/52* (2006.01)
  *G01S 15/89* (2006.01)

(52) U.S. Cl.
  CPC ........... *G01N 29/30* (2013.01); *G01N 29/449* (2013.01); *G01N 29/4436* (2013.01); *G01N 29/4445* (2013.01); *G01S 7/52036* (2013.01); *G01S 15/89* (2013.01); *G06K 9/628* (2013.01); *G06K 9/6262* (2013.01); *G06T 7/001* (2013.01); *G01N 2291/0289* (2013.01); *G06T 2207/10132* (2013.01); *G06T 2207/30136* (2013.01); *G06V 2201/06* (2022.01)

(58) Field of Classification Search
  CPC ............ G01N 29/4445; G01N 29/449; G01N 2291/0289; G01S 7/52036; G01S 15/89; G06K 9/6262; G06K 9/628; G06T 7/001; G06T 2207/10132; G06T 2207/30136; G06T 2207/30164; G06V 2201/06; G06V 10/20
  See application file for complete search history.

(56) References Cited

FOREIGN PATENT DOCUMENTS

| | | | |
|---|---|---|---|
| JP | 2009541765 | A | 11/2009 |
| JP | 2010535343 | A | 11/2010 |
| JP | 2014163805 | A | 9/2014 |
| WO | 2008000940 | A1 | 1/2008 |
| WO | 2009017892 | A1 | 2/2009 |
| WO | 2014118367 | A1 | 8/2014 |

OTHER PUBLICATIONS

International Search Report (PCT/ISA/210) dated Jul. 28, 2017, by the European Patent Office as the International Searching Authority for International Application No. PCT/FI2016/050838.
Written Opinion (PCT/ISA/237) dated Jul. 28, 2017, by the European Patent Office as the International Searching Authority for International Application No. PCT/FI2016/050838.
English Translation of Office Action for JP 2019-530546 dated Jan. 21, 2020.
Valavanis, Ioannis, et al., "Multiclass defect detection and classification in weld radiographic images using geometric and texture features", Expert Systems with Application 37 (2010), pp. 7606-7614.

\* cited by examiner

|  | LOW STRESSED AREAS | HIGH STRESSED AREAS |
|---|---|---|
| REJECTION | FILTER 5, FLAT BOTTOM HOLE 5MM | FILTER 3, FLAT BOTTOM HOLE 3 MM |
| REJECTION, SMALLER FAULTS | FILTER 4, FLAT BOTTOM HOLE 4 MM | FILTER 2, FLAT BOTTOM HOLE 2 MM |
| BORDER PIECE | FILTER 3, FLAT BOTTOM HOLE 3 MM | FILTER 1, FLAT BOTTOM HOLE |
| ACCEPTED LARGER FAULTS | FILTER 2, FLAT BOTTOM HOLE 2 MM | |
| ACCEPTED | FILTER 1, FLAT BOTTOM HOLE 1 MM | |

80

ULTRASONIC QUALITY CONTROL USING FILTERED IMAGE DATA

RELATED APPLICATION

This application claims priority as a continuation application under 35 U.S.C. § 120 to PCT/FI2016/050838 filed as an International Application on Nov. 29, 2016 designating the U.S., the entire content of which is hereby incorporated by reference in its entirety.

TECHNICAL FIELD

Field

The present disclosure relates to an ultrasonic quality control of pieces. The pieces to be checked by ultrasonic probe or probes can be metal pieces, such as metal cast pieces. Ultrasonic examination is a comparative method, and detects indications of imperfections and reflections of normal geometrical shapes inside the material or on surface of the examined object. Therefore the reflections of ultrasonic signal caused by interfaces with different acoustic impedance are referred to as indications. Indications can be acceptable or rejectable. Indications caused by object geometry like front wall and back wall echo are referred as geometrical indications which are acceptable.

Background Information

Ultrasonic inspection is a known way to inspect a piece, like a metal cast or forged piece, for whether it includes any faults. An ultrasonic probe is moved around the piece either manually or with an automated device in order to utilize high frequency sound waves penetrating through the piece. The sound waves propagate in the piece and part of the waves reflects from the surfaces of the piece and from the faults of the piece. The reflected waves can be detected and therefore used to detect the faults. The place, size and shape of the imperfection can be deduced from the reflected waves. It is also known to utilize more than one ultrasonic probe for the inspection.

The reflected waves are presented on a display of a device/system that is used for the inspection. An inspector checks the indications caused by imperfections on the display. In order to do that the inspector must have great professional skills and experience to make a proper analysis. If the indications are minor, the inspector can classify the piece to be accepted. If the piece includes unacceptable imperfections or too many imperfections, the inspector should classify the piece as rejected as per criteria set forth.

Ultrasonic scanning is suitable for using with many metals. However, some metallic materials may have limitations to being checked by the ultrasonic scanning, such as large grain size austenitic steels.

The skills of the inspector can influence how good the inspection results are going to be. This can be an issue, especially in cases where an inspector does not have much experience and where physical and psychological disturbances in normal performance or behavior exist.

SUMMARY

An ultrasonic quality control method of controlling a quality of a piece is disclosed, the method comprising: scanning the piece utilizing at least one ultrasonic probe; forming at least one image from said scanning; scanning a reference piece utilizing at least one ultrasonic probe; forming at least one reference image from said scanning of the reference piece; forming at least one negative image of said at least one reference image; creating at least one indication image by utilizing said at least one image and the negative image; filtering at least one indication image by utilizing several image filters, each image filter filtering data of the indication image other than an image filter specific indication level data; forming several indication levels data from the image filters; and classifying the piece to be accepted or rejected utilizing said several indications levels data.

An ultrasonic inspection device is also disclosed, comprising: a processor device; and an ultrasonic probe, wherein the ultrasonic probe includes software or a circuit board configured to perform scanning, and the processor device includes software or a circuit board/s configured to cause the processor device to perform functions of: scanning the piece utilizing at least one ultrasonic probe; forming at least one image from said scanning; scanning a reference piece utilizing at least one ultrasonic probe; forming at least one reference image from said scanning of the reference piece; forming at least one negative image of said at least one reference image; creating at least one indication image by utilizing said at least one image and the negative image; filtering at least one indication image by utilizing several image filters, each image filter filtering data of the indication image other than an image filter specific indication level data; forming several indication levels data from the image filters; and classifying the piece to be accepted or rejected utilizing said several indications levels data.

BRIEF DESCRIPTION OF THE DRAWINGS

In the following, exemplary embodiments will be described in more detail by reference to the enclosed drawings, where.

DETAILED DESCRIPTION

Figure 1:
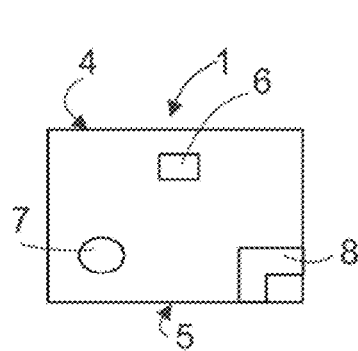
FIG. 1 illustrates an example of a reference piece to be scanned with ultrasonic scanning.

Exemplary embodiments as disclosed herein can alleviate or even eliminate problematic factors of ultrasound inspection.

An ultrasonic quality control method of controlling a quality of a piece according to the present disclosure includes scanning the piece utilizing at least one ultrasonic probe 101; forming at least one image from the scanning 102; scanning a reference piece utilizing at least one ultrasonic probe 103 and; forming at least one reference image from said scanning of the reference piece 104, Further the method includes forming at least one negative image of the at least one reference image 105; creating at least one indication image by utilizing the at least one image and the negative image 106; and filtering at least one indication image by utilizing several image filters, each image filter filtering all data of the indication image other than an image filter specific indication level data 107. The method can include providing several indication levels data from the image filter specific indication level data 108; and classifying the piece to be accepted or rejected utilizing the several indication level data 109.

By utilizing exemplary embodiments as disclosed herein, the classification of the piece to be checked can be arranged to be made automatically. Further the classification is much faster than using known ways of the classification.

Figure 4:
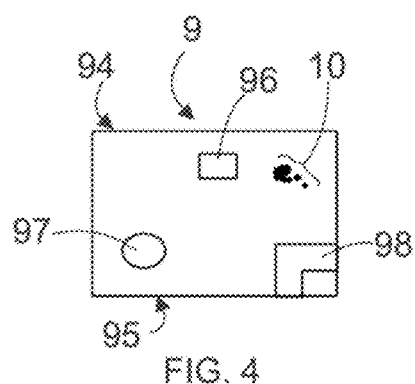
FIG. 4 illustrates an example of a piece to be scanned by ultrasonic inspection.

Inspection of a piece to be checked by an ultrasonic probe or several ultrasonic probes is known. FIG. 4 shows an example of a piece 9 to be checked. It is noted that the piece of FIG. 4 is a schematic piece in order to make this presentation more clear than using a more complex piece. However, exemplary embodiments as disclosed can be used with any piece that can be inspected, or checked, by ultrasonic scanning.

Figure 5:
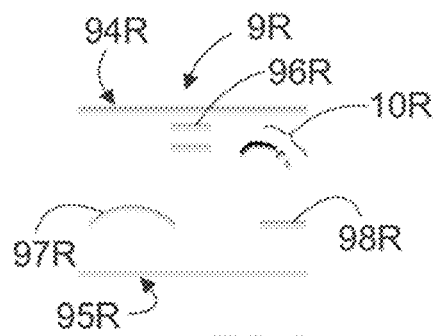
FIG. 5 illustrates an example of an image from the piece.

The piece 9 of FIG. 4 has a front surface 94, a rear surface 95, a rectangular hole 96, an oval hole 97 and a projection 98 having an L-shape. The piece can have some internal faults 10 like holes and cracks. After the scanning of the piece 9, an image 9R is formed that shows reflections of the ultrasonic scanning and can be presented as showed in FIG. 5. FIG. 5 shows reflections from the front surface 94R, reflections from the rear surface 95R, reflections from the oval hole 97R, reflections from the rectangular hole 96R, reflections from the projection 98R and reflections from the faults 10R.

In this scanning example illustrated in FIGS. 4 and 5, the ultrasonic probe is situated/or moved above the front surface 94. As can be seen, the reflection image of FIG. 5 may not be so clear in order to understand what it means. Thus, the experience and skills of the inspector should be at a high level in order to find and access correct information from FIG. 5. Even if the inspector is experienced, the inspection of the reflection images can last a relatively long period and human factors may affect interpretation of any result.

FIG. 1 shows a reference piece 1 of the piece shown in FIG. 4. The reference piece 1 has also a front surface 4, a rear surface 5, a rectangular hole 6, an oval hole 7 and a projection 8 having an L-shape. But the reference piece has no faults, or the faults of the reference piece are only minor faults which can be accepted. In other words the reference piece is a similar piece to the piece to be checked, but without faults or with only minor faults. The reference piece 1 is also scanned like the piece to be checked. So the scanning device for the reference piece is the same or similar with the ultrasonic device used for the piece to be checked. As a result the reference image 2 of the ultrasonic reflections shows reflections from the front surface 4R, reflections from the rear surface 5R, reflections from the oval hole 7R, reflections from the rectangular hole 6R, and reflections from the projection 8R.

Figure 2:
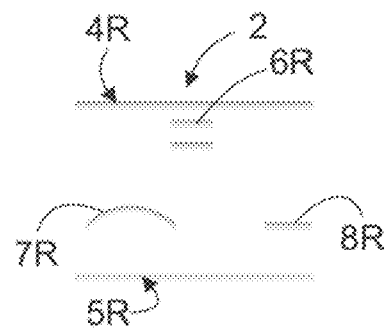
FIG. 2 illustrates an example of a reference image from the reference piece.
Figure 3:
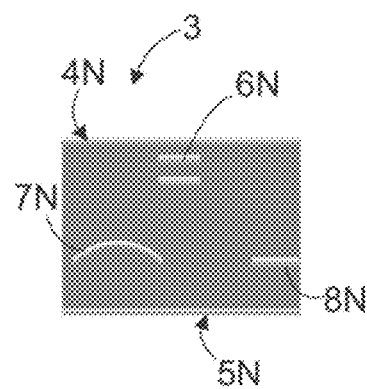
FIG. 3 illustrates an example of a negative image from the reference image.

A negative image is formed from the reference image 2. FIG. 3 shows a negative image 3. At this phase it should be noted that the reflections shown in FIGS. 2, 3 and 5 can be presented in a simple grey scale format in order to illustrate real reflection images in a simple way. As can be seen, the grey scale levels of the negative image 3 are opposite with respect to the grey scale levels of FIG. 2. As such, the negative image 3 shows also reflections from the front surface 4N, reflections from the rear surface 5N, reflections from the oval hole 7N, reflections from the rectangular hole 6N, and reflections from the projection 8N, but as negative with respect to the reference image 2.

Figure 6:
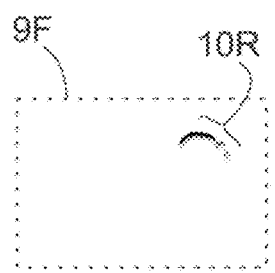
FIG. 6 illustrates an example of an indication image.

The negative image 3 can be used with the reflection image 9R of the piece to be checked in order to create an indication image, which is shown in FIG. 6. The negative image and the reflection image from the piece to be checked are put one on the other. The order of the overlapping image can be in either order. As a result the indication image 9F is created. The overlapping negative image and the reflection image remove geometric reflections of the piece, i.e. the reflections from the front surface 94, reflections from the rear surface 95, reflections from the rectangular hole 96, reflections from the oval hole 97 and the reflections from the projection 98. The reflections from the faults 1 OR remain in the indication image 9F.

At this phase, an image or data containing, for example, only indication information of the piece 9 is provided. In order to determine more accurately what kind of faults are in question, several filters can be used.

Figure 7:
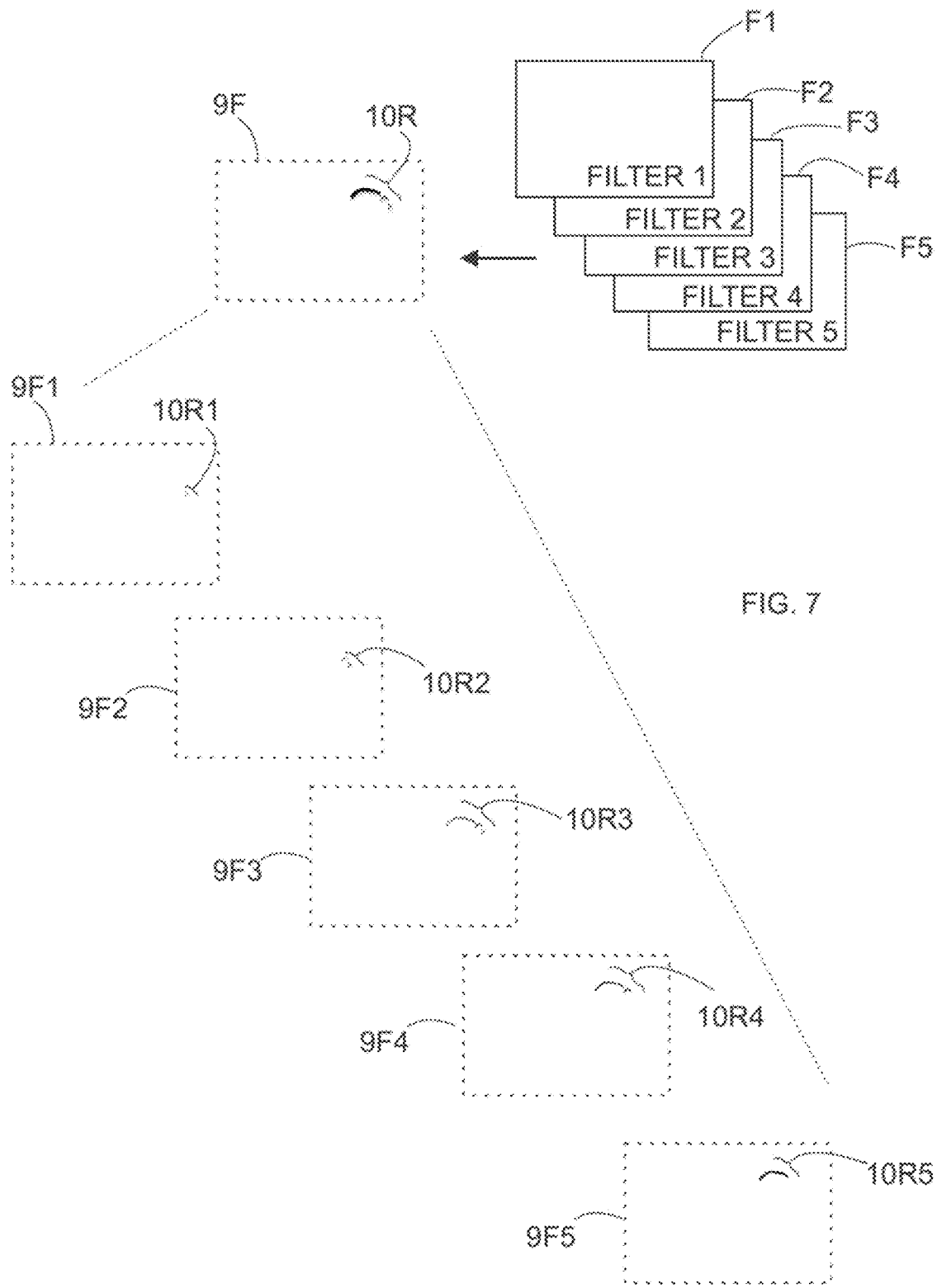
FIG. 7 illustrates an example of filtering the indication image containing indications, and application of several indication levels data.

FIG. 7 illustrates the use of the filters F1, F2, F3, F4 and F5. Each filter filters all data of the indications image 9F except an image filter specific indications level data. For example the filter can pass flat bottom holes whose size is 5 mm in diameter or larger. The other filter may pass flat bottom holes whose size is 4 mm in diameter or less than 5 mm. The other filter may pass flat bottom holes whose size is 3 mm in diameter or less than 4 mm. Further other criteria can be used with the size of the flat bottom hole, or instead of it. The filtering of the indication image is based on the echo response strength/power/energy (echo height in apparatus screen and/or in collected data). A relatively small amount of power/energy reflection can pass through a lower filter like F1 whereas higher power/energy pass through to higher filters like F4 or F5.

The criteria for component acceptability is based on the information provided by each filter. Further each filter may have its specific way to handle the reflections passing through the filter. For example, the filter may combine the reflections passing through as one if they are close to each other. The higher filters like F4 and F5 may combine reflection data from a larger area than the lower filters like F1. This kind of handling can clarify the handling of the indications after the filters.

Therefore, acceptability of a piece can be/is based on the amount of indications, indication dimensions (size), amount of indications as a combined area size of indications, or detections of indications close to each other with an acceptable combination rule, which indications have passed through at least one filter, and are also visible after the filter/s if showed on a display. The combination rule can be defined so that if one indication after the filter is detected an indication or area, there is not allowed to be another indication/indication area nearby within a certain dimension, for example 0.20 mm.

The image data can be in an image format or in another data format. In this context, an image should be understand as data, which can be represented as an image, but it can be represented also in any other suitable format. The same applies to the filters.

The example of FIG. 7 shows also several indication levels data illustrated as images 9F1, 9F2, 9F3, 9F4, and 9F5. Each indication level data shows the indications that passed a specific filter. For example filter F1 has been arranged to pass flat bottom holes having size 1 mm in diameter or less than 2 mm. The number of the holes can be for example 16 at maximum and covering only a certain area of the classification image in total like 45 mm$^2$, and two indications separation can be for example more than 10 mm from each other. The passed holes are represented as indications 10R1.

Filter F2 may be arranged to pass flat bottom holes having size 2 mm in diameter or less than 3 mm. The number of the holes can be for example eight at maximum with similar or changed rules for area size and separation distance as defined for filter 10F. The passed holes are represented as indications 10R2.

Filter F3 may be arranged to pass flat bottom holes having size 3 mm in diameter or less than 4 mm. The number of the holes can be for example four at maximum with similar or changed rules for area size and separation distance as defined for filter 10F. The passed holes are represented as indications 10R3.

Filter F4 may be arranged to pass flat bottom holes having 4 mm in diameter or less than 5 mm. The number of the holes can be for example two at maximum with similar or changed rules for area size and separation distance as defined for filter 10F. The passed holes are represented as indications 10R4.

Filter F5 may be arranged to pass flat bottom holes having 5 mm in diameter or greater where indications passing this filter level are defined to be not acceptable whatever in size, amount and area covered. The passed holes are represented as indications 10R5. This type of filters can have different rules for indication reflectivity size and there can be several non-acceptable filter levels depending of the inspected area criticality.

As can be seen, the indication data shown as images gives a clear view for a human inspector, but it is actually not yet an exclusive goal of this disclosure. At this level several indications levels are achieved which can also be studied, for example in image formats. Each indication level indicates the severity of the indications like the sizes of the holes and cracks and a number of the indications areas covered by indications and proximity of indications. So the indications level data is information of a certain type of indications and possibly a number of those indications and other parameters describing the indications. The type of the indications can depend of the length, deep, shape, and/or size etc. A certain type of the indications has a certain impact to the quality of the piece.

In addition, exemplary embodiments can also classify the checked piece to be accepted or rejected utilizing said indication levels data. Referring to the example of FIG. 7 the piece can be accepted if it includes only indications 10R1 passed filter F1. The piece may also be accepted if it includes larger indications 10R2 that passed filter F2.

The piece 9 can also be classified as a border piece between the accepted pieces and rejected pieces. It may be possible that the border piece could be used in some lower lever implementation requiring not so high quality. In this example, the piece could be classified as the border piece if it includes indications 10R3 that passed filter F3, and it does not comprise larger or more severe indications in amount, area and/or proximity of indications.

The piece 9 can be rejected, if for example, it includes an indication or indications 10R5 passing filter 5. The piece can also be rejected, if it includes minor indications than those passed the filter 5, like the indications 10R4 that passed filter 4.

Figures 8, 9:
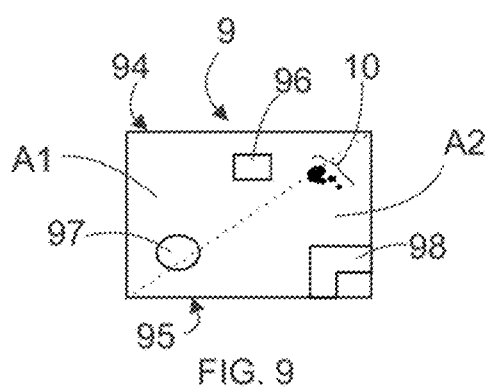
FIG. 8 illustrates an example of a table showing a classification of indications of the example piece.
FIG. 9 illustrates an example of a piece having two areas wherein different classification criteria are used.

FIG. 8 and FIG. 9 show a possible example of how the classification can also be arranged. FIG. 9 shows the checked piece 9 having two areas A1 and A2. A dashed line in FIG. 9 describes the border between the areas. In this example area A1 is a low stressed area and area A2 is a high stressed area. The quality requirements are higher in the high stressed area, so fewer indications can be tolerated in area A2 than in area A1. Table 80 in FIG. 8 shows the acceptance criteria for area A2 and area A1. The area A1 of the piece can be accepted if it includes only indications passed filter F1. The piece may also be accepted if it includes larger indications that passed filter F2 in area A1. The area A1 of the piece 9 is classified as the border piece if it includes indications that passed filter F3, and it does not include larger or more severe indications. The area A1 of the piece 9 is rejected if it includes an indication or indications passing filter 5. The area A1 of the piece can also be rejected if it includes minor indications than those passed the filter 5, like the indications that passed filter 4.

The high stressed area A2 of the piece 9 is rejected if it includes an indication or indications passing filter 3. The piece can also be rejected if it includes minor indications than those passed the filter 3, like the indications that passed filter 2. The area A2 of the piece 9 is classified as the border piece if it includes indications that passed filter F1, and it does not include larger or more severe indications.

As whole the piece 9 can be rejected if it includes any area that is rejected. In other words the piece is accepted if it does not include any rejected areas or possibly any border case areas. It can also be noted that the piece may have more than one area that is determined to be a high stressed area, and/or more than one area that is determined to be a low stressed area. In addition to the high stressed and low stressed areas the piece may also (or alternatively) have an area/s of other types, like a normal stressed area.

As can be seen the piece can be divided into several areas of different stress requirements. This division information may follow with the scanned images to the indication images and finally up to the classification of the piece.

Figure 10:
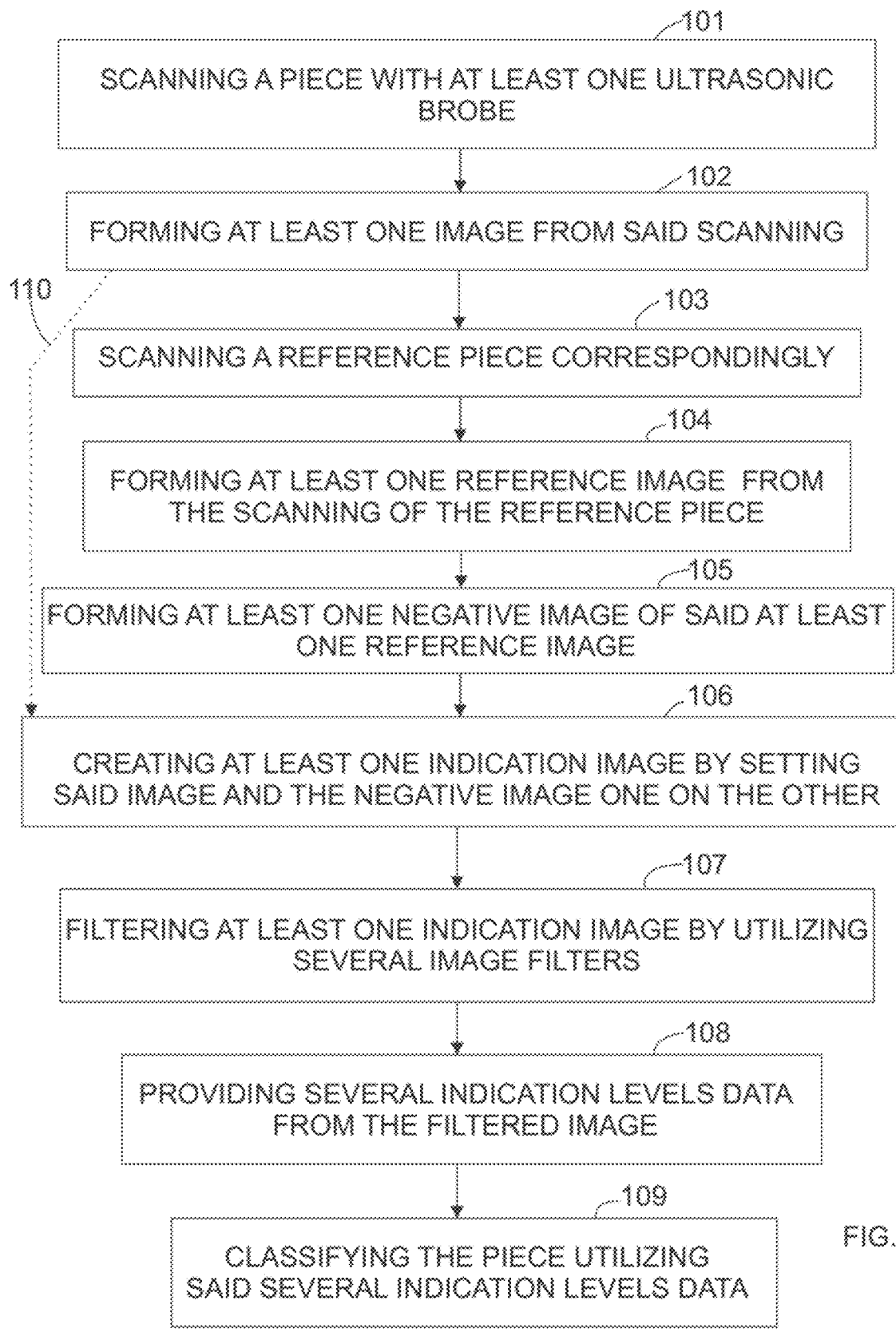
FIG. 10 illustrates an example of a flow chart illustrating a method as described herein.

FIG. 10 shows an example of a flow chart that illustrates a method according to the disclosure. An ultrasonic quality control method of controlling a quality of a piece 9 can include scanning the piece utilizing at least one ultrasonic probe 101, and forming at least one image from said scanning 102. As already said the scanning probe/s and scanning device and inspection data presentation format can be used. In addition, the method can include scanning a reference piece utilizing at least one ultrasonic probe 103, and forming at least one reference image from said scanning of the reference piece 104. The scanning of the reference piece 9 and the forming of the reference image are made similarly as the steps of scanning the piece 101, and forming the image 102. Further the method can include forming at least one negative image of said at least one reference image 105. This step can be made as already discussed.

The steps 103, 104 and 105 can be done after the steps 101 and 102 or before the steps 101 and 102 as illustrated by a dashed line 110 in FIG. 10. In some solutions it may be possible to run the steps 101 and 102 simultaneously or partly simultaneously with the steps 103, 104 and 105 if two similar ultrasonic probe/s and devices can be used.

Further, the method can include creating at least one indication image by utilizing said at least one image and the negative image 106. As described, the negative image and the image of the piece to be checked are put one on the other in order to have the image having only indication information.

The method can include filtering at least one indication image by utilizing several image filters, each image filter filtering all data of the indication image except an image filter specific indication level data 107. So in this way the method can include providing several indication levels data from the image filter specific indication level data 108.

The method can also include classifying the piece to be accepted or rejected utilizing said several or one indication levels data 109. The classification step can utilize, for example, a table wherein the indications levels data are arranged to correspond classification levels. The classification levels are an accepted level and a rejected level at minimum, but more classification levels can also be formed if needed or desired. So, the classifying step 109 can further be arranged to classify the piece utilizing several levels of acceptance and several levels of rejections, and/or the classifying step 109 can further be arranged to classify the piece to be alternatively a border piece between said classifications of acceptance and rejection.

Further the classifying step 109 can include a substep of utilizing several indication levels data filtered from the indication image in an indication image area specific way so that the indication image has at least two areas and the classification utilizes the several indication level data in an area specific way. See FIG. 9.

In order to make the classification of the piece to be more visible for humans the method can include indicating the classifications in classification specific colours in an image format/s corresponding the indication image/s, and displaying the image format/s. For example, the indication level images 9F1, 9F2, 9F3, 9F4 and 9F5 in FIG. 7 can be represented in different colours or combination of colours. Image 9F1 can be light blue, image 9F2 blue, image 9F3 green, image 9F4 yellow, and image 9F5 red. So, each colour may represent a certain indications level data (for example indications of certain sizes/reflectivity). In addition each colour may also indicate a certain classification level. For example in case of FIG. 8 the rejection level may be red for both the low stressed area and the low stressed area. For the smaller indications rejection level the colour can be yellow and for the border piece level green at the both area categories. In addition the accepted level and the larger indications accepted level can be showed as blue and light blue in the low stressed area of the piece.

The image is data that can be shown, for example in a display. It should be understood that image data can also handled in another format, which makes it possible to process the image data in a processor, computers and other suitable devices. The filters can also be filters that filter data from the original data and pass only a certain type of data, like data relating to a certain type of indications.

Figure 11:
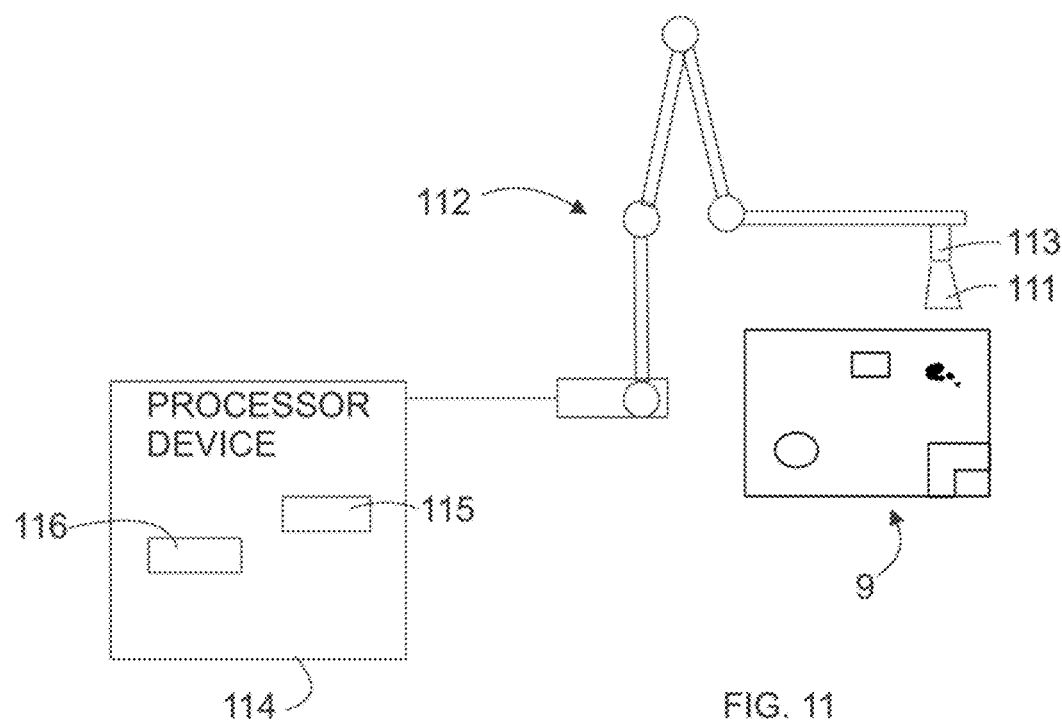
FIG. 11 illustrates an example of an exemplary device according to the disclosure.

FIG. 11 illustrates an example of a ultrasonic checking device according to the present disclosure in a schematic way.

An ultrasonic checking device according to the present disclosure can include at least one probe 111, and a robot device 112 to move the probe/s. The probe/s is connected to at least one ultrasonic source device 113. The ultrasonic source device can be situated in any suitable location of the checking device. There is also a processor device 114, like a computer having certain software or a circuit board/s 115, to provide checking data from the received ultrasonic information from the probe/s. The checking data can be represented as an image/s. The checking device can include also software or a circuit board/s 116 to perform the steps 103-109 of the method described, which software or the circuit board can also be arranged to perform the steps/tasks mentioned. The circuit board/s can, for example, be an integrated circuit (IC). It is also possible that said software or a circuit boards 115, 116 can be integrated as one entity.

Further the ultrasonic checking device can include a pool whereto the piece/s to be checked are situated, and the pool is filled with liquid. In addition, the checking device can include other element/s like a rack for the piece, a rail for the rack, a computer vision device for identifying the piece, a reader device to read a serial number of the piece, a washer to wash the piece before putting it into the pool, a drier to dry the piece after the pool, and a market to mark the piece as checked.

The ultrasonic quality control according to the present disclosure can be used in many different embodiments. The invention is not dependent on any specific ultrasonic scanning technique. There exist several different scanning techniques, for example A-scanning, B-scanning, C-scanning, phased array linear scanning and phased array sectorial scanning, which can be used in exemplary embodiments. One image, one reference image, one negative image and one indication image may be enough in order to classify the piece, but it is also possible to take a number of images if needed or desired. It should be understood that the corresponding images, such as the image, reference image, negative image and the indication image area can actually be the same view of the piece, but containing different information. So, for example when forming a number of negative images from a number of reference images, each negative image to be formed is specific for the reference image that has a certain view from the piece. A negative image can be composed of several reference piece scanning images meaning that each scanning negative information can be combined to one negative image. In this case the image whereto the negative image is used, can is similarly composed of several scanning images.

Exemplary methods as disclosed can be run in a suitable device used for ultrasonic scanning. The device may have a programmable unit or units, which can be programmed to perform the steps of the methods as disclosed. Another possible solution is that the device has a printed circuits board or boards that are dedicated to perform the methods as disclosed.

It will be evident to those skilled in the art that the invention is not limited to the embodiments described in this text but can be implemented in many other different embodiments within the scope of the independent claim.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An ultrasonic quality control method of controlling a quality of a piece, the method comprising:
scanning the piece utilizing at least one ultrasonic probe;
forming at least one image from said scanning;
scanning a reference piece utilizing the at least one ultrasonic probe or at least one other ultrasonic probe;
forming at least one reference image from said scanning of the reference piece;
forming at least one negative image of said at least one reference image;

creating at least one indication image by utilizing said at least one image and the negative image;
filtering said at least one indication image by utilizing several image filters, each image filter being configured to filter data of said at least one indication image so as to pass indication level data specific to an indication;
forming indication level data for each image filter; and
classifying an area of the piece to be accepted or rejected utilizing at least one indication level data.

2. The method according to claim 1, wherein the classifying comprises:
classifying the area of the piece utilizing more than one indication level data.

3. The method according to claim 2, wherein the classifying comprises:
classifying the area of the piece to be a border region piece between an area classified as accepted and an area classified as rejected.

4. The method according to claim 3, wherein:
the area includes the entire surface of the piece; or
the area includes more than one area of the piece, wherein:
the classifying includes accepting or rejecting each area utilizing the same classification criteria, or
the classifying includes accepting or rejecting a first area utilizing a first criteria and accepting or rejecting a second area utilizing a second criteria.

5. The method according to claim 4, comprises:
generating an image format of a classified area.

6. The method according to claim 5, wherein:
generating the image format includes indicating a classification of acceptance in a first colour and indicating a classification of rejection in a second colour.

7. The method according to claim 1, wherein the classifying comprises:
classifying the area of the piece to be a border region between an area classified as accepted and an area classified as rejected.

8. The method according to claim 1, wherein:
the area includes the entire surface of the piece; or
the area includes more than one area of the piece, wherein:
the classifying includes accepting or rejecting each area utilizing the same classification criteria; or
the classifying includes accepting or rejecting a first area utilizing a first criteria and accepting or rejecting a second area utilizing a second criteria.

9. The method according to claim 1, comprising:
generating an image format of the classified area.

10. The method according to claim 9, wherein:
generating the image format includes indicating a classification of acceptance in a first colour and indicating a classification of rejection in a second colour.

11. An ultrasonic checking device comprising:
a processer device; and
an ultrasonic probe, wherein the ultrasonic probe includes software or a circuit board configured to perform scanning, and the processor device includes software or a circuit board/s configured to cause the processor device to perform functions of:
scanning a piece utilizing at least one ultrasonic probe;
forming at least one image from said scanning;
scanning a reference piece utilizing the at least one ultrasonic probe or at least one other ultrasonic probe;
forming at least one reference image from said scanning of the reference piece;
forming at least one negative image of said at least one reference image;
creating at least one indication image by utilizing said at least one image and the negative image;
filtering said at least one indication image by utilizing several image filters, each image filter being configured to filter data of said at least one indication image so as to pass indication level data specific to an indication;
forming indication level data for each image filter; and
classifying an area of the piece to be accepted or rejected utilizing at least one indication level data.

12. The ultrasonic checking device according to claim 11, wherein the software or the circuit board/s is/are also configured to cause the processor to perform functions of:
classifying the area of the piece utilizing more than one indication level data;
classifying the area of the piece to be a border region between an area classified as accepted and an area classified as rejected.

13. The device according to claim 11, wherein the software or the circuit board/s is/are also configured to perform cause the processor to perform functions of:
classifying the an entire surface of the piece as the area; or
classifying the area includes more than one area of the piece, wherein:
the classifying includes accepting or rejecting each area utilizing the same classification criteria; or
the classifying includes accepting or rejecting a first area utilizing a first criteria and accepting or rejecting a second area utilizing a second criteria.

14. The device according to claim 11, wherein the software or the circuit board/s is/are also configured to perform cause the processor to perform functions of:
generating an image format of the classified area.

15. The device according to claim 14, wherein:
generating the image format includes indicating a classification of acceptance in a first colour and indicating a classification of rejection in a second colour.

* * * * *